(12) United States Patent
Oblizajek et al.

(10) Patent No.: US 10,300,757 B2
(45) Date of Patent: May 28, 2019

(54) HYDRAULIC MOUNT APPARATUS AND A SUSPENSION SYSTEM THAT UTILIZES THE HYDRAULIC MOUNT APPARATUS

(71) Applicant: GM GLOBAL TECHNOLOGY OPERATIONS LLC, Detroit, MI (US)

(72) Inventors: Kenneth L. Oblizajek, Troy, MI (US); Wojciech E. Suchta, Richmond Hill (CA)

(73) Assignee: GM Global Technology Operations LLC., Detroit, MI (US)

( * ) Notice: Subject to any disclaimer, the term of this patent is extended or adjusted under 35 U.S.C. 154(b) by 0 days.

(21) Appl. No.: 15/590,495

(22) Filed: May 9, 2017

(65) Prior Publication Data
US 2018/0326807 A1 Nov. 15, 2018

(51) Int. Cl.
| | |
|---|---|
| *B60G 15/06* | (2006.01) |
| *F16F 9/54* | (2006.01) |
| *F16F 13/14* | (2006.01) |
| *B60G 13/14* | (2006.01) |
| *B60G 7/02* | (2006.01) |

(52) U.S. Cl.
CPC ............ *B60G 15/068* (2013.01); *B60G 7/02* (2013.01); *B60G 13/14* (2013.01); *F16F 9/54* (2013.01); *F16F 13/1463* (2013.01); *B60G 2204/128* (2013.01); *B60G 2204/143* (2013.01)

(58) Field of Classification Search
CPC ........... F16F 9/10; B60G 13/06; B60G 13/08; B60G 15/067; B60G 15/068; B60G 15/08; B60G 15/12

USPC .......... 188/321.11; 267/140.11, 140.13, 220, 267/158, 159, 160, 161, 163, 166, 166.1, 267/167; 280/124.155; 137/493, 493.6, 137/493.7, 493.8, 493.9
See application file for complete search history.

(56) References Cited

U.S. PATENT DOCUMENTS

| | | | | |
|---|---|---|---|---|
| 503,344 | A * | 8/1893 | Fletcher ................ | F16L 37/256 267/165 |
| 2,091,195 | A * | 8/1937 | Dennebaum ........ | E01F 15/0423 256/13.1 |
| 3,070,184 | A * | 12/1962 | Riester .................... | E05B 77/50 180/289 |
| 3,302,662 | A * | 2/1967 | Webb .................... | F16K 15/046 137/539 |
| 4,497,394 | A * | 2/1985 | Ferrand .................... | F16F 9/34 188/282.8 |
| 5,183,075 | A * | 2/1993 | Stein .................... | F02M 59/462 137/493.6 |

(Continued)

*Primary Examiner* — Thomas J Williams
(74) *Attorney, Agent, or Firm* — Quinn IP Law (57) ABSTRACT

A hydraulic mount apparatus includes a housing defining a cavity. The apparatus also includes an annular member disposed in the cavity. The annular member is secured to the housing to split the cavity into a first chamber and a second chamber. The apparatus further includes a pressure relief apparatus coupled to the housing. The pressure relief apparatus is configured to allow fluid communication between the first and second chambers in response to a predetermined pressure threshold being reached in at least one of the first and second chambers. A suspension system including a shock absorber and a link is coupled to the shock absorber. The suspension system further includes the hydraulic mount apparatus coupled to one of the shock absorber and the link.

20 Claims, 4 Drawing Sheets

(56) References Cited

U.S. PATENT DOCUMENTS

| | | | | |
|---|---|---|---|---|
| 5,586,627 A * | 12/1996 | Nezu | ............... | B60G 17/08 |
| | | | | 188/266.6 |
| 5,687,959 A * | 11/1997 | Rudolph | ............... | F16F 13/105 |
| | | | | 267/140.12 |
| 6,578,835 B2 * | 6/2003 | Monson | ............... | F16F 1/373 |
| | | | | 188/379 |
| 7,086,413 B2 * | 8/2006 | Yu | ............... | B62D 5/062 |
| | | | | 137/493 |
| 8,177,201 B2 * | 5/2012 | Goudie | ............... | F16F 3/087 |
| | | | | 267/140.11 |
| 8,231,115 B2 * | 7/2012 | Goudie | ............... | F16F 3/087 |
| | | | | 267/140.12 |
| 8,439,336 B2 * | 5/2013 | Moore | ............... | B60G 15/068 |
| | | | | 267/140.13 |
| 9,133,903 B2 * | 9/2015 | Goossens | ............... | F16F 13/08 |

* cited by examiner

FIG. 12

HYDRAULIC MOUNT APPARATUS AND A SUSPENSION SYSTEM THAT UTILIZES THE HYDRAULIC MOUNT APPARATUS

INTRODUCTION

Motor vehicles typically have a suspension system. When the vehicle travels over a bump or a hole in a road, or experiences internally generated forces (such as from rotating components), the suspension system can control forces from these sources, which provides a smooth ride. Some suspension systems can include a hydraulic top mount configured to minimize vibration that is directed to a passenger compartment of the vehicle from the above mentioned sources.

SUMMARY

The present disclosure provides a hydraulic mount apparatus including a housing defining a cavity. The apparatus also includes an annular member disposed in the cavity. The annular member is secured to the housing to split the cavity into a first chamber and a second chamber. The apparatus further includes a pressure relief apparatus coupled to the housing. The pressure relief apparatus is configured to allow fluid communication between the first and second chambers in response to a predetermined pressure threshold being reached in at least one of the first and second chambers.

The present disclosure also provides a suspension system including a shock absorber and a link coupled to the shock absorber. The suspension system further includes a hydraulic mount apparatus coupled to one of the shock absorber and the link. The hydraulic mount apparatus includes a housing defining a cavity and an annular member disposed in the cavity. The annular member is secured to the housing to split the cavity into a first chamber and a second chamber. The hydraulic mount apparatus includes a pressure relief apparatus coupled to the housing. The pressure relief apparatus is configured to allow fluid communication between the first and second chambers in response to a predetermined pressure threshold being reached in at least one of the first and second chambers.

The detailed description and the drawings or FIGS. are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims. The phrase "at least one of" as used herein should be construed to include the non-exclusive logical "or", i.e., A and/or B and so on depending on the number of components.

Figure 1:
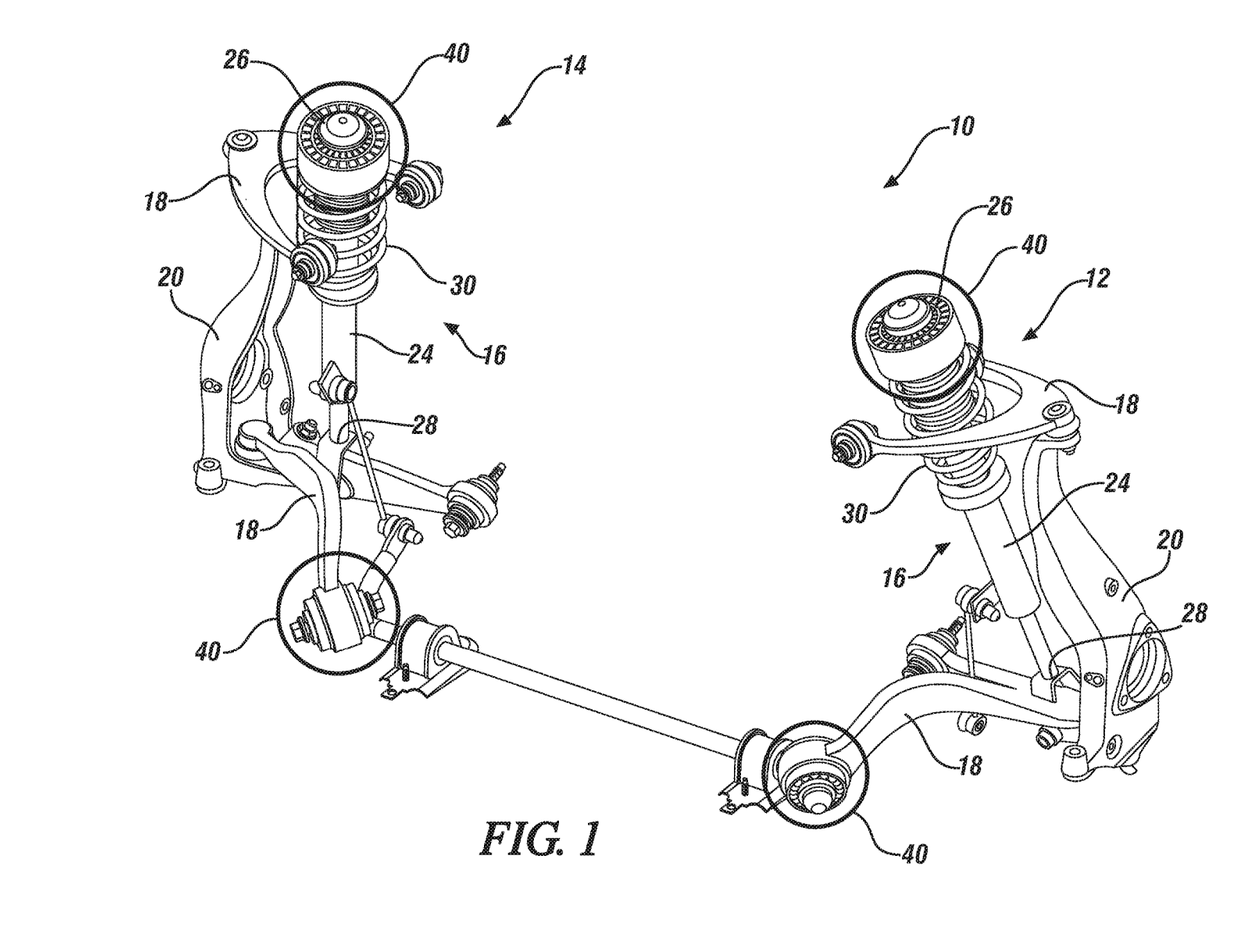
FIG. 1 is a schematic perspective view of a suspension system that generally identifies different locations where a hydraulic mount apparatus can be disposed.

Referring to the FIGS., wherein like numerals indicate like or corresponding parts throughout the several views, a suspension system 10 is generally shown in FIG. 1.

The suspension system 10 can be utilized in a vehicle application and a non-vehicle application. For a vehicle application, the suspension system 10 can be utilized in a car, a sports car, a truck, a boat, an off-road vehicle, a snowmobile, a motorcycle, etc. For the non-vehicle application, the suspension system 10 can be utilized in a machine, equipment, etc.

Furthermore, for the vehicle application, the vehicle can be a hybrid vehicle utilizing an internal combustion engine and one or more motor-generators. Additionally, the vehicle can be an electric vehicle utilizing one or more motor-generators and eliminating the internal combustion engine. As another example, the vehicle can be a vehicle utilizing the internal combustion engine and eliminating the motor-generator(s).

The suspension system 10 can support a structure. In the vehicle application, the structure can include a passenger compartment. Generally, the structure is spaced from a road or the ground. For example, when the vehicle travels over a bump or a hole in the road, or experiences internally generated forces (such as from rotating components), the suspension system 10 can dampen movement of the structure, which provides a smooth ride in the vehicle. For example, the suspension system 10 can dampen movement of the passenger compartment. The structure can include one or more of: a chassis, a support structure, a frame, a subframe, a body, a brace, a panel, an outer skin, etc. Simply stated, the structure can be any component of a sprung mass of the vehicle, or any load-bearing component that is supported by the suspension system 10. It is to be appreciated that the structure can be any suitable configuration.

Referring to FIG. 1, the suspension system 10 can include a first suspension assembly 12 and a second suspension assembly 14 spaced from the first suspension assembly 12. The first and second suspension assemblies 12, 14 cooperate to dampen movement of the structure. The components of the first and second suspension assemblies 12, 14 are substantially the same with the difference being the suspension assemblies 12, 14 are disposed at opposite sides of each other. Therefore, in the vehicle application, for example, the first suspension assembly 12 can be for the driver's side of the vehicle and the second suspension assembly 14 can be for the passenger's side of the vehicle. Due to the similarities of these suspension assemblies 12, 14, the components of one side of the suspension system 10 are discussed below, but it is to be appreciated that the components also apply to the other side.

The suspension system 10 can be any suitable configuration, and non-limiting examples can include short-long arm suspension systems 10, multi-link strut suspension systems 10, etc. One suitable example of the suspension system 10 is illustrated in FIG. 1. Continuing with FIG. 1, the suspension system 10 can include a shock absorber 16 and a link 18 coupled to the shock absorber 16. In certain embodiments, the link 18 is an upper control arm or part of the upper control arm. In other embodiments, the link 18 is a lower control arm or part of the lower control arm. The control arms can be secured to a wheel knuckle 20. Movement of a steering wheel causes the wheel knuckle 20 to change angular positions, which correspondingly changes the steer angle of a wheel.

Figure 2:
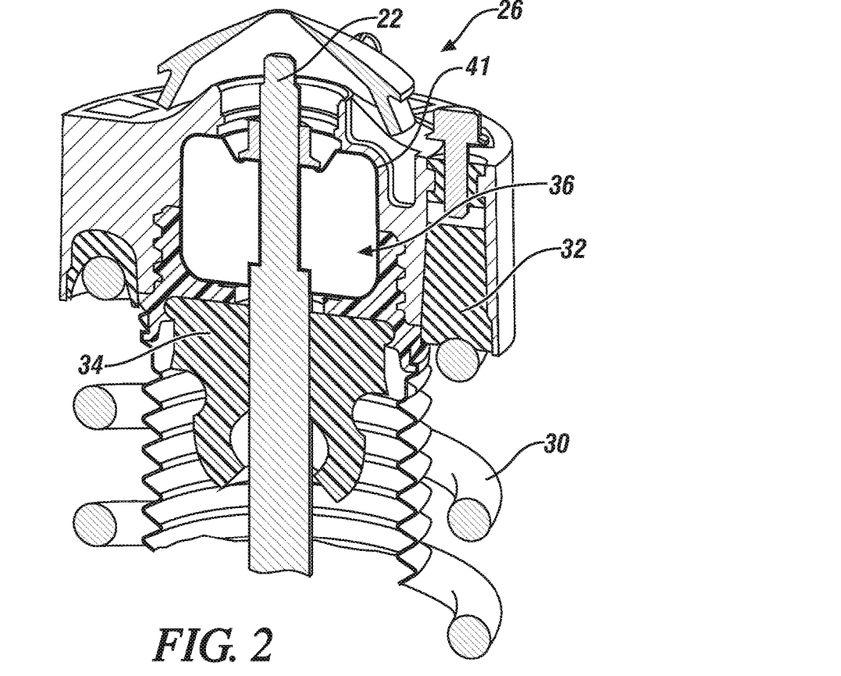
FIG. 2 is a schematic fragmentary cross-sectional view of part of the suspension system to generally illustrate one of the locations of the hydraulic mount apparatus.

Referring to FIGS. 1 and 2, the shock absorber 16 can include a rod 22, a piston and a sleeve 24, with the piston disposed in the sleeve 24 and the rod 22 coupled to the sleeve 24. The piston is movable inside the sleeve 24 which can aid in absorbing or dampening forces due to the road conditions or the internally generated forces.

Continuing with FIG. 1, the shock absorber 16 can also include a first distal end 26 and a second distal end 28 spaced from each other. The first distal end 26 can be secured to the structure and the second distal end 28 can be secured to the lower control arm. The rod 22 can extend to the first distal end 26.

Referring to FIGS. 1 and 2, the suspension system 10 can also include a coil spring 30 surrounding the shock absorber 16, and in certain embodiments, surrounding the sleeve 24. The coil spring 30 is movable in response to road conditions or excitation. The suspension system 10 can further include a spring seat 32, with one end of the coil spring 30 seated in the spring seat 32. Furthermore, the suspension system 10 can include a jounce bumper 34 (see FIG. 2) coupled to the first distal end 26, with the rod 22 disposed through the jounce bumper 34. The jounce bumper 34 can also absorb or dampen forces due to the road conditions. One or more of the rod 22, the spring seat 32, the jounce bumper 34, etc., can be movable relative to the structure due to the road conditions or excitation.

The suspension system 10 can also include a hydraulic mount apparatus 36 to absorb vibrations or dampen forces due to the road condition or excitation. The hydraulic mount apparatus 36 can be surrounded by the spring seat 32. Furthermore, the jounce bumper 34 can be disposed between the hydraulic mount apparatus 36 and the sleeve 24 of the shock absorber 16. The hydraulic mount apparatus 36 can be disposed at the first distal end 26. As such, the hydraulic mount apparatus 36 can be referred to as a hydroelastic top mount (HTM) when located at the first distal end 26, i.e., at the top, of the suspension system 10. The components of the suspension system 10 discussed above causes suspension travel which absorbs or dampen forces due to the road conditions or excitation.

Generally, suspension travel can cause dynamic pressures to build in the hydraulic mount apparatus 36 under moderate vibration conditions such as along highway road surfaces and/or modestly irregular roads. If the suspension travel becomes extreme, due to certain road conditions, the dynamic pressure in the hydraulic mount apparatus 36 can become excessive. Therefore, the hydraulic mount apparatus 36 includes a pressure relief apparatus 38 that minimizes excessive dynamic pressure in the hydraulic mount apparatus 36.

Referring to FIG. 1, different suitable locations of the hydraulic mount apparatus 36 are illustrated. The hydraulic mount apparatus 36 provides fast-acting pressure relief, as discussed further below. Generally, the hydraulic mount apparatus 36 can be utilized in the HTM, as discussed above, or a hydraulic bushing, etc. FIG. 1 illustrates four examples of where the hydraulic mount apparatus 36 can be located (see the circled areas 40 in FIG. 1).

Therefore, as shown in FIG. 1, the hydraulic mount apparatus 36 can be coupled to one of the shock absorber 16 and the link 18. Said differently, the hydraulic mount apparatus 36 can be coupled to the shock absorber 16 or the link 18. In certain embodiments, the hydraulic mount apparatus 36 can be disposed closer to the first distal end 26 (of the shock absorber 16) than the second distal end 28 (of the shock absorber 16). More specifically, in certain embodiments, the hydraulic mount apparatus 36 can be disposed at the first distal end 26 of the shock absorber 16 (see circled area 41 in FIG. 2). As such, the hydraulic mount apparatus 36 can be disposed at the top mount.

The hydraulic mount apparatus 36 can be further defined as a plurality of hydraulic mount apparatuses 36. Therefore, if utilizing a plurality of hydraulic mount apparatuses 36, then one of the hydraulic mount apparatuses 36 can be coupled to one of the shock absorbers 16 and another one of the hydraulic mount apparatus 36 can be coupled to another one of the shock absorbers 16.

As another example, if utilizing a plurality of hydraulic mount apparatuses 36, then one of the hydraulic mount apparatuses 36 can be coupled to one of the links 18 and another one of the hydraulic mount apparatus 36 can be coupled to another one of the links 18. Alternatively, one of the hydraulic mount apparatuses 36 can be coupled to respective shock absorbers 16, and one of the hydraulic mount apparatuses 36 can be coupled to respective links 18, etc. for the desired number of hydraulic mount apparatuses 36.

The hydraulic mount apparatus 36 can be in other locations than illustrated. As discussed above, the hydraulic mount apparatus 36 can be utilized in various locations of the suspension system 10. As another non-limiting example, the hydraulic mount apparatus 36 can be utilized in locations outside of the suspension system 10, such as powertrain mounts.

Figure 3:
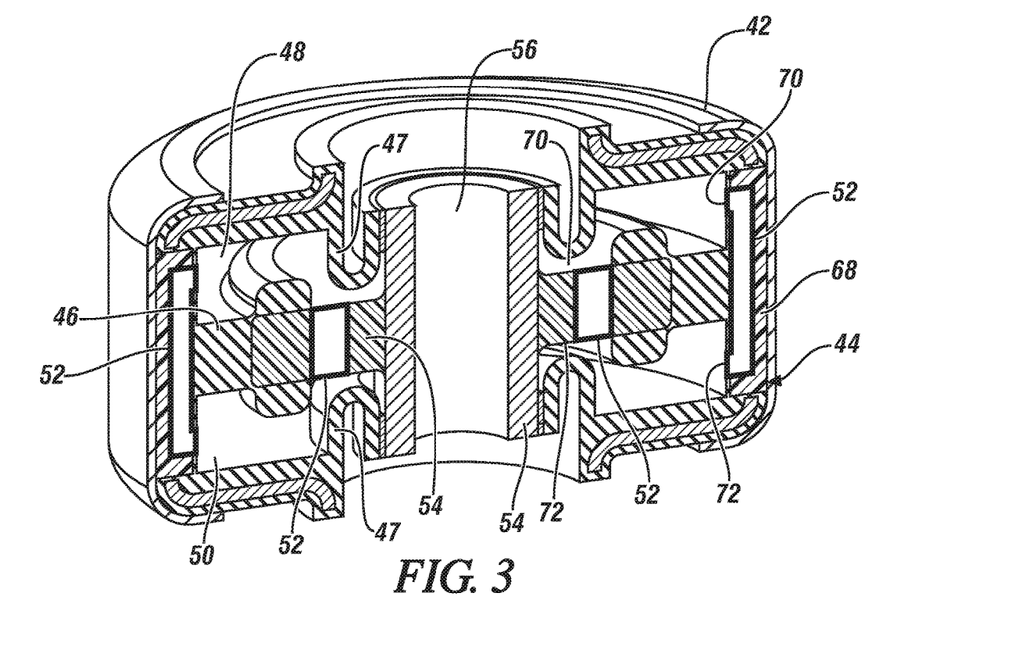
FIG. 3 is a schematic cross-sectional view of a housing of the hydraulic mount apparatus to generally illustrate various locations of a pressure relief apparatus of the hydraulic mount apparatus.

Referring to FIG. 3, the hydraulic mount apparatus 36 includes a housing 42 defining a cavity 44. As shown in FIG. 2, in certain embodiments, the spring seat 32 can be coupled to the housing 42, and the rod 22 can be disposed through the cavity 44. The housing 42 and the cavity 44 can be any suitable configuration.

Continuing with FIG. 3, the hydraulic mount apparatus 36 also includes an annular member 46 disposed in the cavity 44 and secured to the housing 42 to split the cavity 44 into a first chamber 48 and a second chamber 50. Furthermore, the hydraulic mount apparatus 36 can include a membrane 47 that cooperates with the annular member 46 to close the first and second chambers 48, 50. The membrane 47 is flexible and movement of the annular member 46 or the membrane 47 can change the configuration of the first and second chambers 48, 50.

A fluid is disposed in the first and second chambers 48, 50. More specifically, the fluid can be a liquid fluid. The liquid fluid can be any suitable liquid fluid, and non-limiting examples, can include glycol, hydraulic fluid, oil, etc.

Referring to FIGS. 4, 6-9, 10 and 12, the pressure relief apparatus 38 is coupled to the housing 42. The pressure relief apparatus 38 is configured to allow fluid communication between the first and second chambers 48, 50 in response to a predetermined pressure threshold being reached in at least one of the first and second chambers 48, 50. Therefore, if too great of a pressure occurs in one of the first and second chambers 48, 50, the pressure can be relieved by allowing some of the fluid to move to the other one of the first and second chambers 48, 50. The hydraulic mount apparatus 36 provides a compact way to relieve pressure in the chambers 48, 50 via the pressure relief apparatus 38. It is to be appreciated that the actual values of the pressure would vary with the desired application.

FIG. 3 illustrates different locations where the pressure relief apparatus 38 can be disposed. For illustrative purposes only, four examples of where the pressure relief apparatus 38 can be located are illustrated in FIG. 3 (see the boxes 52 in FIG. 3). Generally, FIG. 3 illustrates examples of the pressure relief apparatus 38 being coupled to the inside of the housing 42. As another example, the pressure relief apparatus 38 can be coupled to the outside of the housing 42 and in communication with the chambers 48, 50 inside the housing 42. Therefore, it is to be appreciated that the pressure relief apparatus 38 can be disposed in any suitable location, and the FIGS. are non-limiting examples. Furthermore, it is to be appreciated that a plurality of pressure relief apparatuses 38 can be utilized if desired. Therefore, for example, a plurality of the same configuration of the pressure relief apparatuses 38 can be utilized or one or more of the plurality of the pressure relief apparatuses 38 can be different configurations. Simply stated, the pressure relief apparatuses 38 discussed herein can be mixed and matched to the desired application.

Continuing with FIG. 3, the hydraulic mount apparatus 36 can also include an insert 54, 68 coupled to the housing 42. In certain embodiments, the annular member 46 is at least partially attached to the insert 54, 68, and the membrane 47 is flexible which assists in allowing movement of the annular member 46, and in certain embodiments, movement of the insert 54. Therefore, the insert 54 can move relative to the housing 42, which causes the annular member 46 to move, such as deflect, and this movement of the annular member 46/the insert 54 can change the configuration of the first and second chambers 48, 50.

Generally, the insert 54, 68 is formed of a material more rigid than that of the membrane 47. For example, the membrane 47 can be formed of rubber and the insert 54, 68 can be formed of plastic, metal, such as steel, or any combinations thereof. It is to be appreciated that the insert 54, 68 and the membrane 47 can be formed of any suitable material(s).

The pressure relief apparatus 38 is supported by the housing 42. More specifically, the pressure relief apparatus 38 is supported by the insert 54, 68. The movement of the annular member 46 and/or the membrane 47 creates pressure changes in the first and/or second chambers 48, 50, in which the pressure relief apparatus 38 can alleviate the pressure changes. Different configurations of the pressure relief apparatus 38 are discussed below, which are non-limiting examples. As such, configurations of the pressure relief apparatus 38 that are not illustrated can be utilized.

Referring to FIG. 3, in certain embodiments, the insert 54 can define a through-hole 56. In this embodiment, the insert 54 can be formed of two different materials (as shown in FIG. 3) or the same materials. The rod 22 can be disposed through the through-hole 56, and thus through the cavity 44 as discussed above. The rod 22 can abut the insert 54 inside the through-hole 56 such that movement of the rod 22, due to the road conditions or excitation, is transferred to the insert 54. The movement of the insert 54 due to movement of the rod 22, can cause an increase in pressure that can affect one or more of the components of the hydraulic mount apparatus 36 inside the housing 42 if not utilizing the pressure relief apparatus 38. Therefore, for example, if the rod 22 moves up and down, the insert 54 will move accordingly relative to the housing 42. Furthermore, as another example, if the rod 22 shifts left and right, the insert 54 will move accordingly relative to the housing 42.

Referring to FIGS. 4, 6-9, 10 and 12, for all of the embodiments herein, generally, the insert 54, 68 can define a hole 58. The hole 58 can be in direct fluid communication with at least one of the first and second chambers 48, 50. Furthermore, for all of the embodiments herein (again see FIGS. 4, 6-9, 10 and 12), the pressure relief apparatus 38 can also include a blocking member 60 disposed in the hole 58. The hole 58 is configured large enough to allow movement of the blocking member 60 inside the hole 58.

The blocking member 60 is movable relative to the insert 54, 68 between a closed position such that fluid communication is prevented between the first and second chambers 48, 50, and an actuated position in which the predetermined pressure threshold is reached such that fluid communication occurs between the first and second chambers 48, 50. Said differently, the blocking member 60 can be movable relative to the insert 54, 68 between the closed position such that the blocking member 60 blocks the hole 58 to prevent fluid communication through the hole 58, and the actuated position in which the predetermined pressure threshold is reached such that the blocking member 60 moves away from the hole 58 to allow fluid communication through the hole 58.

The blocking member 60 can be any suitable configuration. Non-limiting examples of the configuration of the blocking member 60 can include a circular configuration, a square configuration, a polygon configuration, a cone configuration, a frusto-conical configuration, etc., or combinations thereof. Therefore, the blocking member 60 can be a ball, a shuttle, a plug, etc., or combinations thereof.

Continuing with FIGS. 4, 6-9, 10 and 12, the pressure relief apparatus 38 can include a biasing member 62 continuously biasing the blocking member 60 to the closed position. The biasing member 62 can be any suitable configuration. Non-limiting examples can include a spring, a coil spring, a Belleville washer, a lever, a cantilever, a leaf-spring, etc.

Figure 7:
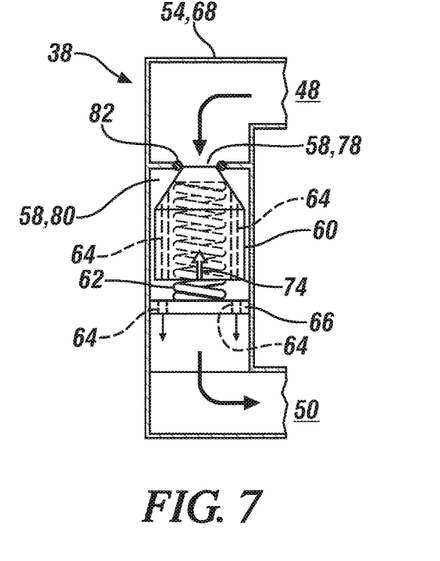
FIG. 7 is a schematic fragmentary illustration of the pressure relief apparatus of yet another configuration.
Figure 8:
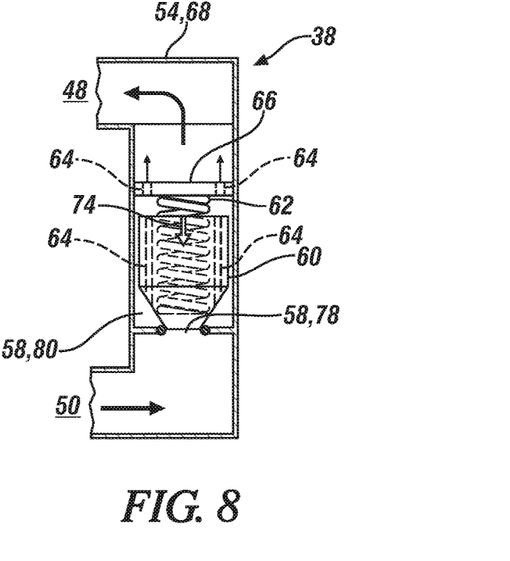
FIG. 8 is a schematic fragmentary illustration of the pressure relief apparatus of FIG. 7, with the orientation flipped 180 degrees.

Furthermore, in certain embodiments, as shown in FIGS. 4, 6, 9, 10 and 12, the insert 54, 68 can define a passageway 64 in direct fluid communication with the hole 58 and one of the first and second chambers 48, 50. The passageway 64 can provide fluid communication between the first and second chambers 48, 50 when the predetermined pressure threshold is reached. Therefore, the passageway 64 provides fluid communication between the first and second chambers 48, 50 when the blocking member 60 is in the actuated position. Said differently, when the blocking member 60 is in the actuated position, the fluid is allowed through the passageway 64 to one of the first and second chambers 48, 50. In other embodiments, as shown in FIGS. 7 and 8, the pressure relief apparatus 38 can include a plate 66 that can define the passageway 64, which will be discussed further below.

The passageway 64 can be any suitable configuration and any suitable number of passageways 64 can be utilized. For illustrative purposes only, the FIGS. illustrate many different configurations of the passageway 64. The passageway(s) 64 are sized to provide the desired fluid displacement between the first and second chambers 48, 50 to produce the desired flow rate due to the movement of the annular member 46/the membrane 47 per the desired application.

Referring to FIG. 3, in certain embodiments, the insert 54 can be disposed inside the cavity 44 and can be movable relative to the housing 42. In this embodiment, the annular member 46 can at least partially surround the insert 54. Continuing with FIG. 3, in other embodiments, the insert 68 is fixed to the housing 42 such that the insert 68 is stationary relative to the housing 42. It is to be appreciated that the insert 68 can be fixed to the inside of the housing 42 or the outside of the housing 42.

Furthermore, in yet other embodiments, the insert 54, 68 is further defined as a plurality of inserts 54, 68. The inserts 54, 68 can be any suitable configuration, and can be different configurations from each other. Therefore, the insert 54, 68 can be further defined as a first insert 54 and the hydraulic mount apparatus 36 can further include a second insert 68 spaced from the first insert 54. The first insert 54 can define the through-hole 56 and the first insert 54 can be movable relative to the housing 42. For illustrative purposes only, as shown in FIG. 3, the first and second inserts 54, 68 are different configurations. When utilizing a plurality of inserts 54, 68, the first insert 54 can be disposed inside the cavity 44, with the annular member 46 at least partially surrounding the first insert 54. Furthermore, in this embodiment, the second insert 68 can be fixed to the housing 42 such that the second insert 68 is stationary relative to the housing 42. FIG. 3 illustrates two boxes 52 along the first insert 54 and two boxes 52 along the second insert 68 to generally indicate suitable locations of the pressure relief apparatus 38.

Referring to FIG. 3, the insert 54, 68 can include a first surface 70 and a second surface 72 spaced from the first surface 70. For each of the embodiments herein, the hole 58 can be defined through at least one of the first and second surfaces 70, 72. Therefore, each of the inserts 54, 68, discussed herein, can include the first and second surfaces 70, 72. FIG. 3 illustrates two inserts 54, 68 and examples of the first and second surfaces 70, 72 for each. Generally, the first surface 70 can cooperate with the first chamber 48 and the second surface 72 can cooperate with the second chamber 50. Continuing with the locations of the first and second inserts 54, 68 of FIG. 3, the first and second surfaces 70, 72 of the first insert 54 oppose each other, and the first and second surfaces 70, 72 of the second insert 68 is separated by the annular member 46.

The components of the pressure relief apparatus 38 can cooperate with either or both of the first and second inserts 54, 68. Therefore, all of the embodiments of the pressure relief apparatus 38 discussed herein applies to both the first and second inserts 54, 68. FIGS. 4-12 and 14 illustrate various configurations of the pressure relief apparatus 38, which will be discussed in detail below. Again, more than one of the pressure relief apparatuses 38 of FIGS. 4-12 and 14 can be utilized.

Figure 4:
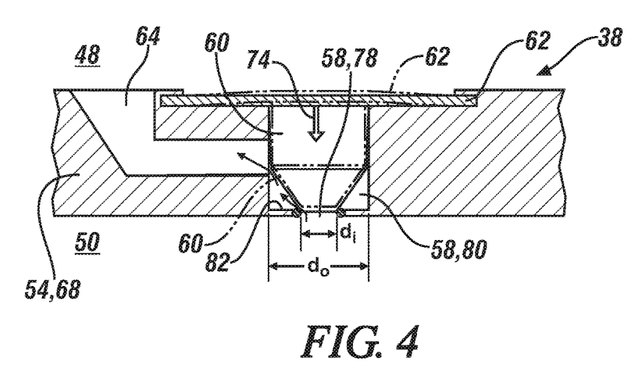
FIG. 4 is a schematic fragmentary illustration of the pressure relief apparatus of one configuration.

Referring to FIG. 4, the pressure relief apparatus 38 includes the blocking member 60, the biasing member 62 and the passageway 64. The biasing member 62 is secured to the insert 54 and applies a force 74 to the blocking member 60 to continuously bias the blocking member 60 to the closed position. The closed position is shown in solid lines in FIG. 4, and the actuated position is shown in phantom lines in FIG. 4. It is to be appreciated that the position of the blocking member 60 in the FIGS. when in the actuated position relative to the closed position can be greater than illustrated. The same illustrative concept applies for the closed and actuated positions for all of the embodiments discussed herein.

Figures 5, 6:
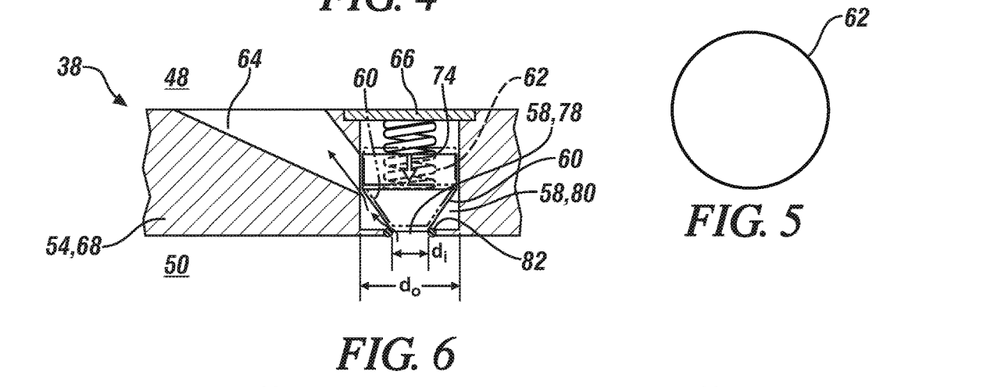
FIG. 5 is a schematic top view of a biasing member of the pressure relief apparatus that can be utilized with the configurations of FIGS. 4 and 12.
FIG. 6 is a schematic fragmentary illustration of the pressure relief apparatus of another configuration.

The embodiment of FIG. 4 illustrates one suitable configuration of the biasing member 62. For example, the biasing member 62 can be a Belleville washer. Therefore, in this embodiment, the biasing member 62 can be a circular configuration. For example, as shown in FIG. 5, the biasing member 62 can be configured without any apertures or holes therethrough, i.e., an outer surface of the biasing member 62 is continuous.

Figures 11, 13:
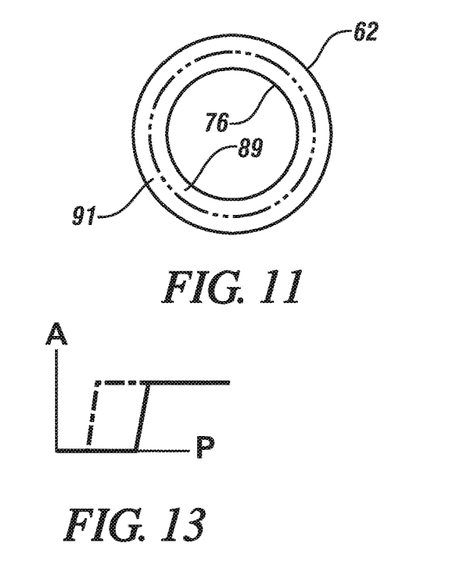
FIG. 11 is a schematic top view of a biasing member of another configuration that can be utilized with the configuration of FIG. 10.
FIG. 13 is a schematic illustration of a chart that identifies area vs pressure.

Alternatively, the pressure relief apparatus 38 can be designed such that the biasing member 62 can define an aperture 76 as shown in FIG. 11, in which the blocking member 60 engages the biasing member 62 outside of the aperture 76. Therefore, the biasing member 62 can be a Belleville washer defining the aperture 76. It is to be appreciated that the aperture 76 can influence the stiffness of the biasing member 62. In this configuration, the passageway 64 can be as illustrated in FIG. 4 and/or the blocking member 60 can be designed with one or more passageways 64 therethrough. The passageway(s) 64 can provide additional fluid communication which can reduce flow restrictions.

Continuing with FIG. 4, the blocking member 60 optionally does not have any apertures. Said differently, the fluid does not move through the blocking member 60, and instead moves around the blocking member 60. Therefore, movement of the blocking member 60 to the actuated position allows the fluid to enter the hole 58 and pass through the passageway 64 to one of the first and second chambers 48, 50.

For each of the embodiments herein (again see FIGS. 4, 6-9, 10 and 12), the pressure relief apparatus 38 is designed to provide fast-acting pressure relief between the first and second chambers 48, 50. For all of the embodiments herein (again see FIGS. 4, 6-9, 10 and 12), the blocking member 60 quickly moves to the actuated position at one predetermined pressure threshold and returns to the closed position at another predetermined pressure threshold which can be referred to as the switching hysteresis (see FIG. 13). Generally, the predetermined pressure threshold to move to the actuated position is greater than the predetermined pressure threshold to move to the closed position. FIG. 13, "A" represents the area of the blocking member 60 in which the pressure acts on, and "P" represents the predetermined pressure threshold. The thick solid line of FIG. 13 represents the blocking member 60 moving from the closed position to the actuated position. When the thick solid line of FIG. 13 is along the horizontal axis at "P", the blocking member 60 is in the closed position, and when the thick solid line angles away from the horizontal axis at "P", that represents movement of the blocking member 60 toward the actuated position, i.e., when the fluid can flow between chambers 48, 50, and when the horizontal thick solid line is spaced from and parallel to the horizontal axis at "P", the blocking member 60 is fully open in the actuated position. The dashed line of FIG. 13 represents the blocking member 60 moving from the actuated position to the closed position. When the dashed line of FIG. 13 is spaced from and parallel to the horizontal axis at "P", the blocking member 60 is fully open in the actuated position, and when the dashed line angles away from the horizontal axis at "P", that represents movement of the blocking member 60 toward the closed position, and when the dashed line is along the horizontal axis at "P", the blocking member 60 is in the closed position (due to the dashed line overlapping with the thick solid line, the dashed line is not visible along the horizontal axis at "P"). As shown in FIG. 13, more pressure is utilized to moving the blocking member 60 to the actuated position as compared to moving the blocking member 60 to the closed position. Having different areas $A_1$, $A_2$ allows for a fast-acting pressure relief for the hydraulic mount apparatus 36.

Figure 14:
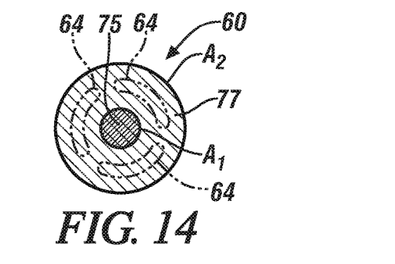
FIG. 14 is a schematic end view of a blocking member.

When the blocking member 60 is in the closed position, a first portion 75 of the blocking member 60 plugs the hole 58 which can represent an area $A_1$ in FIG. 14. Continuing with FIG. 14, when the blocking member 60 is in the actuated position, the blocking member 60 presents a second portion 77 which also encompasses the first portion 75 and can represent an area $A_2$. The fast-acting opening of the pressure relief apparatus 38 can be described by equation (1). Specifically, the predetermined pressure threshold is reached to initiate movement of the blocking member 60 to the actuated position by equation (1):

$$P_o = F/A_1 \qquad (1)$$

wherein:
$P_o$ is the pressure acting on the area $A_1$ of the blocking member 60,
F is the force 74 applied to the blocking member 60 by the biasing member 62, and
$A_1$ is the area $A_1$ of the first portion 75 of the blocking member 60.

When the blocking member 60 is in the actuated position, the pressure acts on the area $A_2$ in FIG. 14. Therefore, the blocking member 60 initiates return to the closed position based on the area $A_2$. As such, the another predetermined pressure threshold initiated movement of the blocking member 60 to the closed position which can be described by equation (2). Specifically, the predetermined pressure threshold is reached to initiate movement of the blocking member 60 to the closed position by equation (2):

$$P_c = F/A_2 \qquad (2)$$

wherein:
$P_c$ is the pressure acting on the area $A_2$ of the blocking member 60,
F is the force 74 applied to the blocking member 60 by the biasing member 62, and
$A_2$ is the area of the second portion 77 of the blocking member 60.

For the embodiments of FIGS. 4, 6, 9, 10 and 12, the hole 58 can include a first portion 78 having a first diameter $d_i$ and a second portion 80 having a second diameter $d_o$, with the first diameter $d_i$ being less than the second diameter $d_o$. Having different diameters of the hole 58 allows for a fast-acting pressure relief for the hydraulic mount apparatus 36. Optionally, a seal 82 can be disposed around various locations of the hole 58 to prevent the fluid from leaking through the hole 58. For all of the embodiments herein (again see FIGS. 4, 6-9, 10 and 12), one or more seals 82 can be utilized.

For the embodiments of FIGS. 4, 6, 9, 10 and 12, the fast-acting opening of the pressure relief apparatus 38 can also be described by equation (3). Specifically, the predetermined pressure threshold is reached to initiate movement of the blocking member 60 to the actuated position by equation (3):

$$P_o = F/(\pi d_i^2/4) \qquad (3)$$

wherein:
$P_o$ is the pressure required to move the blocking member 60 to the actuated position,
F is the force 74 applied to the blocking member 60 by the biasing member 62, and
$d_i$ is the first diameter $d_i$ of the hole 58.

The blocking member 60 can also initiate return to the closed position when the another predetermined pressure threshold is reached by equation (4):

$$P_c = F/(\pi d_o^2/4) \qquad (4)$$

wherein:
$P_c$ is the pressure required to move the blocking member 60 to the closed position or maintain the blocking member 60 in the closed position,
F is the force 74 applied to the blocking member 60 by the biasing member 62, and
$d_o$ is the second diameter $d_o$ of the hole 58.

For the embodiments of FIGS. 4, 6, 9, 10 and 12, the force 74 continuously applied to the blocking member 60 can also be described by equation (5). Specifically, the preload force 74 applied to the blocking member 60 to bias the blocking member 60 to the closed position is equation (5):

$$F = P_o(\pi d_o^2/4) \qquad (5)$$

wherein:
F is the force 74 applied to the blocking member 60 by the biasing member 62,
$P_o$ is the pressure required to move the blocking member 60 to the actuated position, and
$d_o$ is the second diameter $d_o$ of the hole 58. a3

Equations (1) and (2) above are the equations that can be utilized for all of the embodiments of the pressure relief apparatus 38 herein. The orientation of the pressure relief apparatus 38 can be changed depending on which of the chambers 48, 50 that the pressure is to be relieved from. For example, referring to FIG. 4, when the first chamber 48 is in direct fluid communication with the passageway 64 and the second chamber 50 is in direct fluid communication with the first portion 78 of the hole 58, pressure can be relieved from the second chamber 50. In this example, when the blocking member 60 is in the actuated position, the fluid moves from the second chamber 50 into the hole 58, through the passageway 64 and into the first chamber 48 to relieve pressure in the second chamber 50.

The orientation of the pressure relief apparatus 38 of FIG. 4 can be rotated 180 degrees, i.e., flipped over, in which the first chamber 48 is in direct fluid communication with the first portion 78 of the hole 58 and the second chamber 50 is in direct fluid communication with the passageway 64. In this configuration, pressure can be relieved from the first chamber 48. As such, in the flipped over configuration, when the blocking member 60 is in the actuated position, the fluid moves from the first chamber 48 into the hole 58, through the passageway 64 and into the second chamber 50 to relieve pressure in the first chamber 48. Therefore, depending on the desired pressure relief, either or both chambers 48, 50 can utilize the configuration of FIG. 4 to provide a fast-acting reduction of pressure.

Turning to FIG. 6, the pressure relief apparatus 38 utilizes a different biasing member 62 as compared to FIG. 4. In other words, instead of utilizing a Belleville washer or a similar biasing member 62, the embodiment of FIG. 6 utilizes a coil spring. Furthermore in this embodiment, the pressure relief apparatus 38 can include the plate 66 secured to the insert 54 which provides a surface for the biasing member 62 to bias against. The plate 66 can be any configuration, and non-limiting examples can include circular, square, polygon, triangular, oval, etc. Therefore, the blocking member 60 is movable relative to the plate 66.

The blocking member 60 can include a seat for one end of the coil spring, or alternatively, the blocking member 60 can be configured to abut an outer surface of the blocking member 60. In this arrangement, when the blocking member 60 is in the actuated position, the fluid can enter the hole 58 and pass through the passageway 64 to one of the first and second chambers 48, 50. As similarly discussed for FIG.4, the orientation of the pressure relief apparatus 38 of FIG. 6 can be rotated 180 degrees, i.e., flipped over. Therefore, depending on the desired pressure relief, either or both chambers 48, 50 can utilize the configuration of FIG. 6 to provide a fast-acting reduction of pressure.

Referring to FIGS. 7 and 8, the pressure relief apparatus 38 utilizes the same biasing member 62 as FIG. 6 but the location of the passageway 64 has changed. FIGS. 7 and 8 illustrate one pressure relief apparatus 38 in one orientation to relieve pressure in the first chamber 48 and another pressure relief apparatus 38 rotated 180 degrees to relieve pressure in the second chamber 50. Therefore, FIGS. 7 and 8 provide an illustration of the 180 degree rotation, i.e., flipped over, that can also apply to FIGS. 4 and 6.

In the embodiment of FIGS. 7 and 8, the plate 66 is secured to the insert 54 and defines at least one passageway 64. If the blocking member 60 is sized with clearance between an outer periphery of the blocking member 60 and an inner surface of a wall that defines the hole 58, then the fluid can pass around the blocking member 60 and into the passageway 64 of the plate 66. In addition to, or alternatively to the clearance between the blocking member 60 and the wall, the blocking member 60 can define at least one passageway 64 that the fluid can pass through. For illustrative purposes only, a plurality of passageways 64 are illustrated in FIGS. 7 and 8. In this arrangement, when the blocking member 60 is in the actuated position, the fluid can enter the hole 58, pass around the blocking member 60 and enter the passageway 64 of the plate 66 and exit to one of the first and second chambers 48, 50. Continuing with this arrangement, if the blocking member 60 defines the passageway(s) 64, when the blocking member 60 is in the actuated position, the fluid can enter the hole 58, pass through the passageway(s) 64 of the blocking member 60 and enter the passageway(s) 64 of the plate 66 and exit to one of the first and second chambers 48, 50. It is to be appreciated that any suitable number of passageways 64 can be utilized for the blocking member 60 and/or the plate 66. Furthermore, the passageways 64 through the plate 66 and/or the blocking member 60 can be any suitable configuration, and non-limiting examples can include circular, oval, square, triangular, elongated, arcuate, polygon and/or combinations thereof. Referring to FIG. 14, phantom lines have been added to represent the optional feature of having passageways 64 through the blocking member 60. The passageways 64 are spaced from the area $A_1$ due to that area being the area that plugs the hole 58 when the blocking member 60 is in the closed position.

For the embodiments where the blocking member 60 defines one or more passageways 64, such as FIGS. 7 and 8, equations 3-5 do not apply. Also with regard to the embodiments where the blocking member 60 defines the passageway(s) 64, there are other factors which can affect the dynamic performance of blocking member 60 due to the flow of fluid through the passageway(s) 64.

Figure 9:
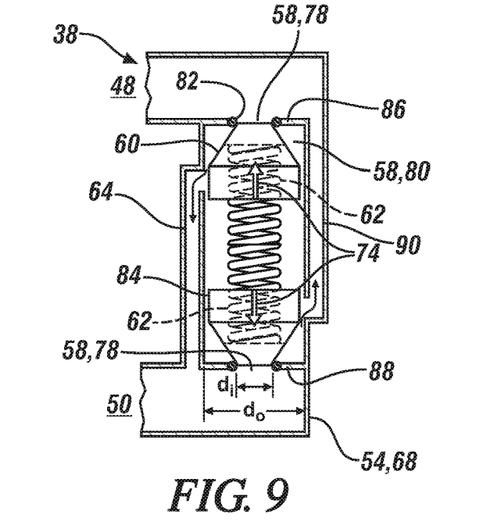
FIG. 9 is a schematic fragmentary illustration of the pressure relief apparatus of still another configuration.
Figure 10:
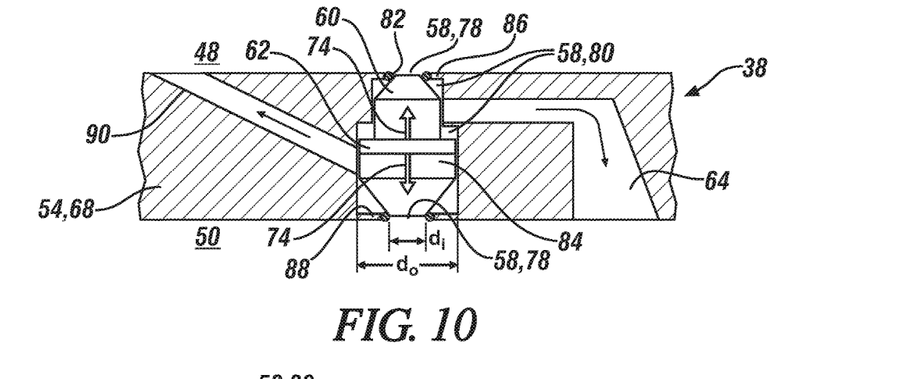
FIG. 10 is a schematic fragmentary illustration of the pressure relief apparatus of yet another configuration.
Figure 12:
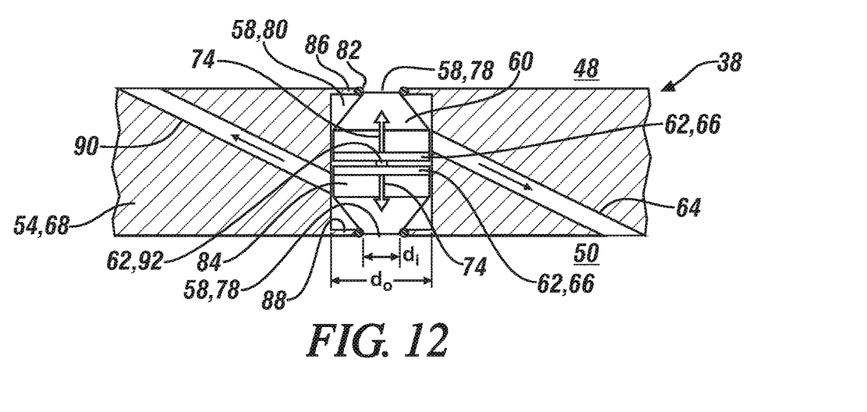
FIG. 12 is a schematic fragmentary illustration of the pressure relief apparatus of another configuration.

Referring to FIGS. 9, 10 and 12, generally, the number of blocking members 60 is changed such that one location can provide two direction pressure relief In these embodiments, the blocking member 60 is further defined as a first blocking member 60 disposed in the hole 58. Continuing with these embodiments, the pressure relief apparatus 38 can include a second blocking member 84 disposed in the hole 58. Generally, for these embodiments, the first and second blocking members 60, 84 are orientated in an opposing relationship. Therefore, instead of having two pressure relief apparatuses 38 in two different locations to accommodate pressure relief in two directions, one pressure relief apparatus 38 can be utilized at one location that can provide dual direction pressure relief. The equations 1-5 discussed above also applies to the embodiments of the second blocking member 84, and furthermore, the graph of FIG. 13 applies to the embodiments of the second blocking member 84.

Continuing with FIGS. 9, 10 and 12, the insert 54 can define the hole 58 having a first end 86 in direct fluid communication with the first chamber 48 and a second end 88 in direct fluid communication with the second chamber 50. The first blocking member 60 can be movable relative to the insert 54 between a closed position such that the first blocking member 60 blocks the first end 86 of the hole 58 to prevent fluid communication between the first and second chambers 48, 50, and an actuated position in which the predetermined pressure threshold is reached in the first chamber 48 such that the first blocking member 60 moves away from the first end 86 to allow fluid communication between the first and second chambers 48, 50.

The second blocking member 84 can be movable relative to the insert 54 between a closed position such that the second blocking member 84 blocks the second end 88 of the hole 58 to prevent fluid communication between the first and second chambers 48, 50, and an actuated position in which the predetermined pressure threshold is reached in the second chamber 50 such that the second blocking member 84 moves away from the second end 88 to allow fluid communication between the first and second chambers 48, 50.

Again, continuing with these embodiments, the passageway 64 can be further defined as a first passageway 64. The first passageway 64 can be in direct fluid communication with the hole 58 and one of the first and second chambers 48, 50. The insert 54 can define a second passageway 90 in direct fluid communication with the hole 58 and the other one of the first and second chambers 48, 50. Generally, the first and second passageways 64, 90 are spaced from each other. The first passageway 64 can provide fluid communication between the first and second chambers 48, 50 when the predetermined pressure threshold is reached in the first chamber 48 such that the first blocking member 60 moves to the actuated position. Therefore, when the first blocking member 60 is in the actuated position, the fluid can move into the hole 58 through the first end 86, through the first passageway 64 and into the second chamber 50. The second passageway 90 can provide fluid communication between the first and second chambers 48, 50 when the predetermined pressure threshold is reached in the second chamber 50 such that the second blocking member 84 moves to the actuated position. Therefore, when the second blocking member 84 is in the actuated position, the fluid can move into the hole 58 through the second end 88, through the second passageway 90 and into the first chamber 48.

Generally, the differences between FIGS. 9, 10 and 12 are the configurations of the biasing members 62. Referring to FIG. 9, the biasing member 62 is a coil spring. Referring to FIG. 10, the biasing member 62 is a Belleville washer. Alternatively, for the embodiment of FIG. 10, the biasing member 62 can be a coil spring. Referring to FIG. 12, the biasing member 62 acts as a cantilever, which will be discussed further below.

Turning back to the FIG. 9 embodiment, one biasing member 62, such as a coil spring, can be utilized, or a plurality of biasing members 62, such as coil springs, can be utilized. Therefore, for example, one biasing member 62 can be disposed between the first and second blocking members 60, 84, or two or more biasing members 62 can be disposed between the first and second blocking member 60, 84. The biasing member(s) 62 continuously biasing the first and second blocking members 60, 84 to the closed position.

Continuing with FIG. 9, optionally, the plate 66 can be eliminated. When the plate 66 is eliminated, and two coil springs are utilized, the abutting ends of the coil springs provide the surface to bias against. It is to be appreciated that the plate 66 can be disposed between the first and second blocking members 60, 84 in certain embodiments, and the plate 66 provides the surface for the biasing member 62 to bias against. The first and/or second blocking members 60, 84 can include the seat for respective ends of the coil spring(s) to seat against. Alternatively, one end of the respective coil spring(s) can abut the outer surface of the first and/or second blocking members 60, 84. Furthermore, it is to be appreciated that the hole 58 at the first end 86 and the hole 58 at the second end 88 can be the same diameter or different diameters from each other depending on the desired application.

In the FIG. 10 embodiment, the biasing member 62 is disposed between the first and second blocking members 60, 84. In this embodiment, the biasing member 62 is a Belleville washer. As such, one biasing member 62 can be utilized that continuously biases the first and second blocking members 60, 84 to the closed position. FIG. 11 illustrates one suitable biasing member 62 that can be utilized between the first and second blocking members 60, 84 of FIG. 10. The biasing member 62 of FIG. 11 can define the aperture 76 as discussed above.

Continuing with FIG. 10, the first and second blocking members 60, 84 can be different sizes. For example, maximum outer diameters of the first and second blocking members 60, 84 can be different. For illustrative purposes only, the second blocking member 84 is illustrated with an outer diameter greater than the outer diameter of the first blocking member 60. It is to be appreciated that the hole 58 at the first end 86 and the hole 58 at the second end 88 can be the same diameter or different diameters from each other depending on the desired application.

FIG. 11 illustrates a phantom line encircling part of the biasing member 62. The first blocking member 60 engages the biasing member 62 on an inner portion 89 of the phantom line, and it is the inner portion 89 that continuously biases the first blocking member 60 to the closed position. The second blocking member 84 engages the biasing member 62 on an outer portion 91 of the phantom line, and it is the outer portion 91 that continuously biases the second blocking member 84 to the closed position. Therefore, one biasing member 62 can provide the desired preload to bias both of the first and second blocking members 60, 84 to the closed position.

Referring to FIG. 12, the biasing member 62 is disposed between the first and second blocking members 60, 84. In this embodiment, the biasing member 62 can be two plates 66 interconnected by a central support 92. The plates 66 can bias relative to the central support 92. The plates 66 are fixed to the central support 92 which causes the plates 66 to act as a cantilever when a force 74 is applied to the plates 66 away from the central support 92. The plates 66 can be configured as shown in FIG. 5, without any apertures or holes therethrough, i.e., an outer surface of the biasing member 62 is continuous. The first blocking member 60 is biased to the closed position via one of the plates 66 and the second blocking member 84 is biased to the closed position via another one of the plates 66.

Continuing with FIG. 12, the first and second blocking members 60, 84 can be the same size or different sizes. Furthermore, it is to be appreciated that the hole 58 at the first end 86 and the hole 58 at the second end 88 can be the same diameter or different diameters from each other depending on the desired application.

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A hydraulic mount apparatus comprising:
a housing defining a cavity;
an annular member disposed in the cavity and secured to the housing to split the cavity into a first chamber and a second chamber;
a pressure relief apparatus coupled to the housing and configured to allow fluid communication between the first and second chambers in response to a predetermined pressure threshold being reached in at least one of the first and second chambers;
an insert coupled to the housing and defining a hole in fluid communication with the first and second chambers, and the pressure relief apparatus is supported by the insert;
wherein:
the pressure relief apparatus includes a blocking member disposed inside the hole, and the blocking member is movable relative to the insert between a closed position to prevent fluid communication between the first and second chambers and an actuated position in which the predetermined pressure threshold is reached to allow fluid communication between the first and second chambers;
the blocking member includes a first portion having a surface characterized by the absence of a bore such that the first portion plugs the hole when the blocking member is in the closed position;

the pressure relief apparatus includes a biasing member continuously biasing the blocking member to the closed position;

the insert defines at least one passageway in fluid communication with the hole, and the at least one passageway includes a portion that increases in size;

the hole of the insert includes a first end in direct fluid communication with the first chamber and a second end in direct fluid communication with the second chamber;

the blocking member is further defined as a first blocking member, and the first blocking member blocks the first end of the hole when the first blocking member is in the closed position;

the pressure relief apparatus includes a second blocking member disposed inside the same hole as the first blocking member, and the second blocking member is movable relative to the insert between a closed position in which the second blocking member blocks the second end of the hole to prevent fluid communication between the first and second chambers, and an actuated position in which the predetermined pressure threshold is reached in the second chamber which causes the second blocking member to move away from the second end to allow fluid communication between the first and second chambers;

the biasing member is one biasing member that continuously biases the first and second blocking members to the respective closed position;

the biasing member includes a first side and a second side, with the first side facing the first blocking member and a second side facing the second blocking member;

a first portion of the first side abuts the first blocking member to continuously bias the first blocking member to the closed position to block the first end of the hole;

a first portion of the second side abuts the second blocking member to continuously bias the second blocking member to the closed position to block the second end of the hole;

the first portion of the first side and the first portion of the second side are offset from each other on opposite sides of the biasing member;

the first blocking member includes a maximum outer diameter and the second blocking member includes a maximum outer diameter greater than the maximum outer diameter of the first blocking member; and the first and second sides of the biasing member each include a maximum outer diameter greater than the maximum outer diameter of the first blocking member.

2. The apparatus as set forth in claim 1 wherein the at least one passageway of the insert is in direct fluid communication with the hole and one of the first and second chambers, and wherein the at least one passageway provides fluid communication between the first and second chambers when the predetermined pressure threshold is reached.

3. The apparatus as set forth in claim 1 wherein the insert is disposed inside the cavity and movable relative to the housing, and wherein the annular member at least partially surrounds the insert, and the insert defines a through-hole.

4. The apparatus as set forth in claim 1 wherein the insert is fixed to the housing such that the insert is stationary relative to the housing.

5. The apparatus as set forth in claim 1 wherein the insert is further defined as a first insert and further including a second insert spaced from the first insert, with the first insert disposed inside the cavity, wherein the annular member at least partially surrounds the first insert, and wherein the first insert defines a through-hole and the first insert is movable relative to the housing, and wherein the second insert is fixed to the housing such that the second insert is stationary relative to the housing.

6. The apparatus as set forth in claim 1 wherein the insert includes a first surface and a second surface spaced from the first surface, and wherein the hole is defined through at least one of the first and second surfaces, and wherein the hole includes a first portion having a first diameter and a second portion having a second diameter, with the first diameter being less than the second diameter.

7. The apparatus as set forth in claim 6 wherein the predetermined pressure threshold is reached to initiate movement of the blocking member to the actuated position by equation:

$$P_o = F/A_1$$

wherein $P_o$ is the pressure acting on an area of the blocking member;

wherein F is the force applied to the blocking member by the biasing member; and wherein $A_1$ is the area of a first portion of the blocking member.

8. The apparatus as set forth in claim 6 wherein another predetermined pressure threshold is reached to initiate movement of the blocking member to the closed position by equation:

$$P_c = F/A_2$$

wherein $P_c$ is the pressure acting on an area of the blocking member;

wherein F is the force applied to the blocking member by the biasing member; and wherein $A_2$ is the area of a second portion of the blocking member.

9. The apparatus as set forth in claim 1 wherein:

the second blocking member is disposed in the hole and orientated differently than the first blocking member;

the at least one passageway is further defined as at least one first passageway, and the at least one first passageway is in direct fluid communication with the hole and one of the first and second chambers;

the insert defines at least one second passageway in direct fluid communication with the hole and the other one of the first and second chambers; and the at least one first passageway provides fluid communication between the first and second chambers when the predetermined pressure threshold is reached in the first chamber such that the first blocking member moves to the actuated position, and the at least one second passageway provides fluid communication between the first and second chambers when the predetermined pressure threshold is reached in the second chamber such that the second blocking member moves to the actuated position.

10. A suspension system comprising:

a shock absorber;

a link coupled to the shock absorber; and a hydraulic mount apparatus coupled to one of the shock absorber and the link, the apparatus including:

a housing defining a cavity;

an annular member disposed in the cavity and secured to the housing to split the cavity into a first chamber and a second chamber;

a pressure relief apparatus coupled to the housing and configured to allow fluid communication between the first and second chambers in response to a predetermined pressure threshold being reached in at least one of the first and second chambers;
an insert defining a hole;
wherein:
the pressure relief apparatus includes a blocking member disposed inside the hole, and the blocking member is movable between a closed position to prevent fluid communication between the first and second chambers and an actuated position to allow fluid communication between the first and second chambers when the predetermined pressure threshold is reached;
the blocking member includes a first portion that completely plugs the hole when the blocking member is in the closed position to prevent fluid communication between the first and second chambers;
the insert defines at least one passageway spaced from the blocking member;
the hole of the insert and the at least one passageway of the insert cooperate with each other to allow fluid communication between the first and second chambers when the blocking member is in the actuated position;
the hole of the insert includes a first end in direct fluid communication with the first chamber and a second end in direct fluid communication with the second chamber;
the blocking member is further defined as a first blocking member, and the first blocking member blocks the first end of the hole when the first blocking member is in the closed position;
the pressure relief apparatus includes a second blocking member disposed inside the same hole as the first blocking member, and the second blocking member is movable relative to the insert between a closed position in which the second blocking member blocks the second end of the hole to prevent fluid communication between the first and second chambers, and an actuated position in which the predetermined pressure threshold is reached in the second chamber which causes the second blocking member to move away from the second end to allow fluid communication between the first and second chambers;
a plurality of biasing members, with one of the biasing members abutting the first blocking member and another one of the biasing members abutting the second blocking member, and the biasing members continuously biases the respective first and second blocking members to the respective closed position; and
a central support is disposed between the biasing members to present a space between the biasing members that allows the biasing members to bias relative to the central support.

11. The system as set forth in claim 10:
wherein the shock absorber including a rod, with the rod disposed through the cavity;
wherein the shock absorber includes a first distal end and a second distal end spaced from each other; and
wherein the hydraulic mount apparatus is disposed closer to the first distal end than the second distal end.

12. The system as set forth in claim 11 further including:
a coil spring surrounding the shock absorber;
a spring seat coupled to the housing, with one end of the coil spring seated in the spring seat; and
a jounce bumper coupled to the first distal end, with the rod disposed through the jounce bumper.

13. A hydraulic mount apparatus comprising:
a housing defining a cavity;
an annular member disposed in the cavity and secured to the housing to split the cavity into a first chamber and a second chamber;
a pressure relief apparatus coupled to the housing and configured to allow fluid communication between the first and second chambers in response to a predetermined pressure threshold being reached in at least one of the first and second chambers;
an insert coupled to the housing and defining a hole having a first portion, and wherein the pressure relief apparatus is supported by the insert;
wherein:
the pressure relief apparatus includes a blocking member disposed inside the hole, and the blocking member is movable between a closed position to prevent fluid communication between the first and second chambers and an actuated position to allow fluid communication between the first and second chambers;
the blocking member includes a first portion having a surface characterized by the absence of a bore such that the surface plugs the first portion of the hole when the blocking member is in the closed position;
the pressure relief apparatus includes a biasing member continuously biasing the blocking member to the closed position; and
at least one passageway that is non-concentric with the hole and in fluid communication with the hole, and the at least one passageway includes a first portion and a second portion connected to each other, and with the first portion of the at least one passageway disposed between the first portion of the hole and the second portion of the at least one passageway, and wherein the second portion of the at least one passageway increases in size in a direction that fluid flows out of the pressure relief apparatus.

14. The apparatus as set forth in claim 13 wherein:
the hole of the insert includes a first end in direct fluid communication with the first chamber and a second end in direct fluid communication with the second chamber;
the blocking member is further defined as a first blocking member, and the first blocking member blocks the first end of the hole when the first blocking member is in the closed position;
the pressure relief apparatus includes a second blocking member disposed inside the same hole as the first blocking member, and the second blocking member is movable relative to the insert between a closed position in which the second blocking member blocks the second end of the hole to prevent fluid communication between the first and second chambers, and an actuated position in which the predetermined pressure threshold is reached in the second chamber which causes the second blocking member to move away from the second end to allow fluid communication between the first and second chambers;
the biasing member is one biasing member that continuously biases the first and second blocking members to the respective closed position;
the biasing member includes a first side and a second side, with the first side facing the first blocking member and a second side facing the second blocking member;

a first portion of the first side abuts the first blocking member to continuously bias the first blocking member to the closed position to block the first end of the hole;
a first portion of the second side abuts the second blocking member to continuously bias the second blocking member to the closed position to block the second end of the hole; and
the first portion of the first side and the first portion of the second side are offset from each other on opposite sides of the biasing member.

15. The apparatus as set forth in claim 14 wherein:
the first blocking member includes a maximum outer diameter and the second blocking member includes a maximum outer diameter greater than the maximum outer diameter of the first blocking member; and
the first and second sides of the biasing member each include a maximum outer diameter greater than the maximum outer diameter of the first blocking member.

16. The apparatus as set forth in claim 13 wherein:
the hole of the insert includes a first end in direct fluid communication with the first chamber and a second end in direct fluid communication with the second chamber;
the blocking member is further defined as a first blocking member, and the first blocking member blocks the first end of the hole when the first blocking member is in the closed position;
the pressure relief apparatus includes a second blocking member disposed inside the same hole as the first blocking member, and the second blocking member is movable relative to the insert between a closed position in which the second blocking member blocks the second end of the hole to prevent fluid communication between the first and second chambers, and an actuated position in which the predetermined pressure threshold is reached in the second chamber which causes the second blocking member to move away from the second end to allow fluid communication between the first and second chambers;
the biasing member is further defined as a plurality of biasing members, with one of the biasing members abutting the first blocking member and another one of the biasing members abutting the second blocking member, and the biasing members continuously biases the respective first and second blocking members to the respective closed position; and
a central support is disposed between the biasing members to present a space between the biasing members that allows the biasing members to bias relative to the central support.

17. The apparatus as set forth in claim 13 wherein:
the at least one passageway is further defined as a plurality of passageways;
the pressure relief apparatus includes a plate defining one of the passageways spaced from the blocking member;
the blocking member defines another one of the passageways spaced from the first portion of the blocking member and spaced from the plate;
the one of the passageways of the plate and/or the one of the passageways of the blocking member include the second portion that increases in size; and
the hole of the insert, the one of the passageways of the plate and the one of the passageways of the blocking member cooperate with each other to allow fluid communication.

18. The apparatus as set forth in claim 17 wherein:
the insert is coupled to the housing, and wherein the pressure relief apparatus is supported by the insert;
the blocking member is movable relative to the insert between the closed position and the actuated position in which the predetermined pressure threshold is reached such that the first portion of the blocking member moves to open the hole to allow fluid communication through the hole; and
the biasing member is spaced from the at least one passageway of the plate and the at least one passageway of the blocking member.

19. The apparatus as set forth in claim 18 wherein:
the pressure relief apparatus is further defined as a first pressure relief apparatus configured to relieve pressure in the first chamber and a second pressure relief apparatus spaced from the first pressure relief apparatus and configured to relieve pressure in the second chamber;
the blocking member is further defined as a first blocking member and the hole is further defined as a first hole, and wherein the first blocking member has a first orientation relative to the first hole;
the plate is further defined as a first plate, and the at least one passageway of the first plate is further defined as at least one first passageway of the first plate;
the at least one passageway of the first blocking member is further defined as at least one first passageway of the first blocking member;
the second pressure relief apparatus include a second blocking member and the insert includes a second hole spaced from the first hole, and the second blocking member is disposed inside the second hole;
the second blocking member has a second orientation relative to the second hole opposite of the first orientation of the first blocking member;
the second blocking member is movable between a closed position to prevent fluid communication between the first and second chambers and an actuated position to allow fluid communication between the first and second chambers when the predetermined pressure threshold is reached;
the second blocking member includes a first portion that completely plugs the second hole when the second blocking member is in the closed position to prevent fluid communication between the first and second chambers;
the second pressure relief apparatus include a second plate defining at least one second passageway spaced from the second blocking member;
the second blocking member defines at least one second passageway spaced from the first portion of the second blocking member and spaced from the second plate; and
the second hole of the insert, the at least one second passageway of the second plate and the at least one second passageway of the second blocking member cooperate with each other to allow fluid communication between the first and second chambers when the second blocking member is in the actuated position.

20. The apparatus as set forth in claim 13 wherein the insert defines the at least one passageway, and the first portion of the at least one passageway is directly connected to the hole, and the second portion of the at least one passageway is spaced from the hole.

* * * * *